United States Patent [19]

Walker

[11] 4,121,283

[45] Oct. 17, 1978

[54] INTERFACE DEVICE FOR ENCODING A DIGITAL IMAGE FOR A CRT DISPLAY

[75] Inventor: James Terrell Walker, Palo Alto, Calif.

[73] Assignee: Cromemco Inc., Mountain View, Calif.

[21] Appl. No.: 760,106

[22] Filed: Jan. 17, 1977

[51] Int. Cl.[2] .................. G06F 3/14

[52] U.S. Cl. .................. 364/200; 340/324 AD

[58] Field of Search ... 364/200 MS File, 900 MS File; 340/324 AD, 146.3 MA, 146.3 H; 235/151; 358/280, 260, 261

[56] References Cited

U.S. PATENT DOCUMENTS

| | | | |
|---|---|---|---|
| 3,549,939 | 12/1970 | Smitzer | 340/324 AD X |
| 3,558,811 | 1/1971 | Montevecchio et al. | 358/280 X |
| 3,696,392 | 10/1972 | Fossum et al. | 340/324 AD |
| 3,742,289 | 6/1973 | Koeijmans | 364/900 X |
| 3,805,253 | 4/1974 | McLanaghan | 340/324 AD |
| 3,893,075 | 7/1975 | Orban et al. | 340/324 AD X |
| 3,906,480 | 9/1975 | Schwartz et al. | 364/900 X |
| 3,911,403 | 10/1975 | O'Neill, Jr. | 364/900 |
| 3,973,245 | 8/1976 | Belser | 364/200 |
| 3,976,982 | 8/1976 | Eiselen | 364/900 |
| 4,020,281 | 4/1977 | Davis, Jr. | 340/324 AD X |

*Primary Examiner*—Melvin B. Chapnick
*Attorney, Agent, or Firm*—Paul Hentzel

[57] ABSTRACT

A display interface connected between a computer and a CRT device processes predetermined blocks of display data from predetermined locations in a memory of the computer to form pixels having predetermined characteristics in the display fields of the CRT device. A CRT display format of parameters such as color, pixel shape and size, and field shape and size, is controlled by input FORMAT DATA. The display resolution can be varied to accommodate the amount of data to be displayed within the desired field dimensions. The display data is retrieved from memory in data blocks, each of which is identified by a BLOCK ADDRESS. A single data block may occupy the entire display field; or may be displayed in a subfield simultaneously with other data blocks, or portions of data blocks, in the remaining subfields. The FORMAT DATA determines the subfield number and arrangement.

31 Claims, 10 Drawing Figures

PIXEL CONTROLLER 230

REQ DATA

HOR SYNC GEN 600
HOLD CPU
FF
START LINE
RECYCLE INHIBIT
PIXEL LATCH
64ENABLE
NYBBLE CONTROL
64EN
PIXEL COUNTER 610
SYNC IN
OSC
PIXEL CLK
620
BURST ENABLE
HOR SYNC

VER SYNC GEN 700

CPU CONTROL LOGIC 800

INTERFACE DEVICE FOR ENCODING A DIGITAL IMAGE FOR A CRT DISPLAY

FIELD OF THE INVENTION

This invention relates to an interface device between a computer and a display device, and more particularly to such an interface device which can accommodate changes in display format and memory addressing.

DISCUSSION OF THE PRIOR ART

Heretofore software has been the primary control in the operation of CPU-CRT interface devices. Straightforward, homogeneous displays, require only simple software housekeeping steps. However, a complex display, or series of displays, with shifting memory addresses can create a very cumbersome software overhead.

SUMMARY OF THE INVENTION

It is therefore an object of this invention to provide:

a display interface for controlling the pixel dimensions of a CRT display;

a display interface for controlling the color, intensity, and shades of grey of the display;

a display interface for controlling the display field dimension;

a display interface which retrieves blocks of display data from memory for display on a CRT alone, or simultaneously with other blocks of data or portions thereof;

a display interface which can instantaneously change the display format and/or the address of the retrieved blocks of display data; and a display interface which can process multiple subfields for simultaneous display.

BRIEF DESCRIPTION OF THE DRAWING

Further objects and advantages of the present invention and the operation thereof will become apparent from the following detailed descriptions taken in conjunction with the drawings in which.

THE GENERAL SYSTEM

Figure 1:
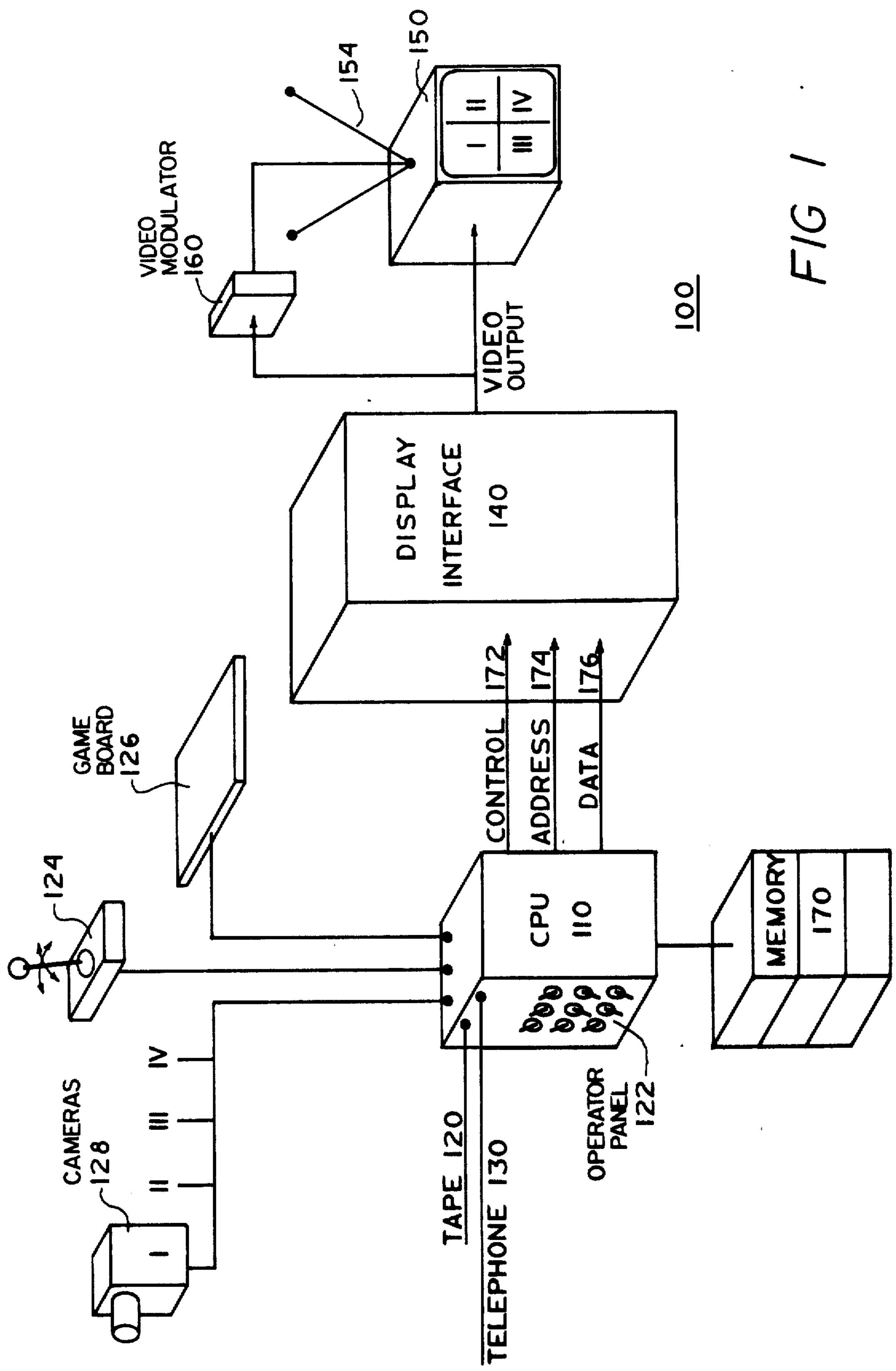
FIG. 1 is an isometric view of a computer system employing the present invention.

FIG. 1 shows the entire computer display system 100 in which CPU 110 is time shared between:

(a) executing a program or instructions in response to input devices such as magnetic or paper tape 120, operator panel 122, direction control (joy stick) 124, game boards 126, cameras 128 I–IV, telephone terminal 130, etc.; and (b) receiving and processing display data to display interface device 140 to generate an image on a display device such as TV 150.

VIDEO OUTPUT from interface device 140 may be applied directly to the video amplifier of TV 150 subsequent to the video detector stage or through TV antenna 154 via video modulator 160. A programable memory 170 accumulates the display data as CPU 110 executes the input programs. Display interface 140 assumes control of CPU 110 on a periodic basis, preferably once each scan line, via control bus 172. Display interface 140 then interrogates memory 170 via address bus 174 and receives display data for that scan line from memory 170 via data bus 176.

DISPLAY INTERFACE 140

Figure 2:
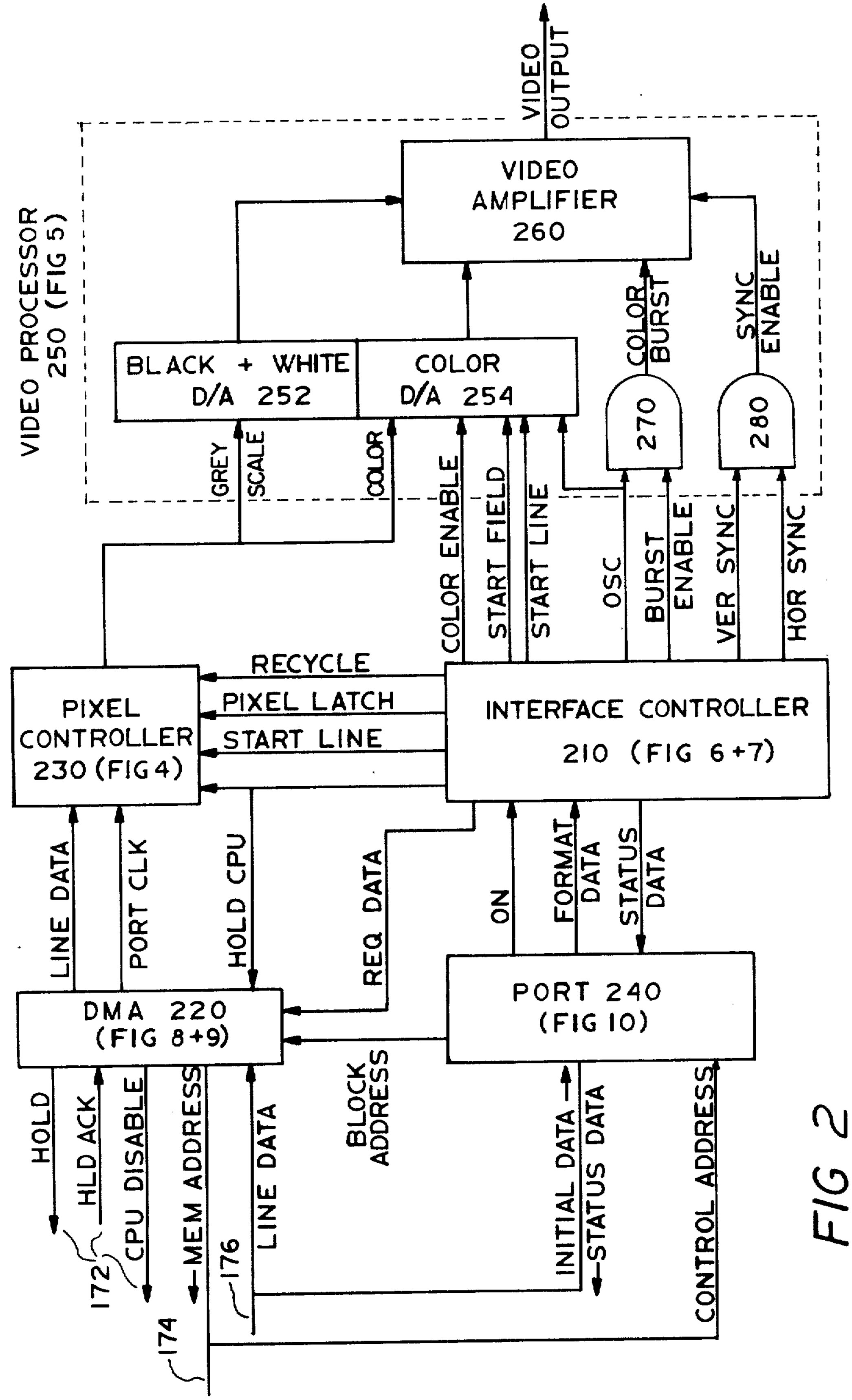
FIG. 2 is a diagram showing functional blocks and logic circuits within the display interface device 140 of FIG. 1.

FIG. 2 shows a block diagram of display interface device 140. Interface controller 210 coordinates the operation of CPU 110 and display device 150 with the other circuits within interface device 140 to process LINE DATA one block or scan line at a time from programable memory 170 to TV display 150.

Prior to displaying LINE DATA, CPU 110 initializes interface controller 210 and DMA controller 220 via INITIAL DATA on data bus 176. INITIAL DATA includes:

(a) ON DATA to interface controller 210.

(b) BLOCK ADDRESS to DMA controller 220 which identifies the block in memory 170 where the desired block or scan line of LINE DATA is stored.

(c) FORMAT DATA to interface controller 210 for interpreting LINE DATA in terms of intensity, color, greyscale, resolution, etc.

STATUS DATA is continuously available to CPU 110 from interface controller 210 via data bus 176 for supplying ODD-EVEN scan line data and a START FIELD signal.

Figure 3:
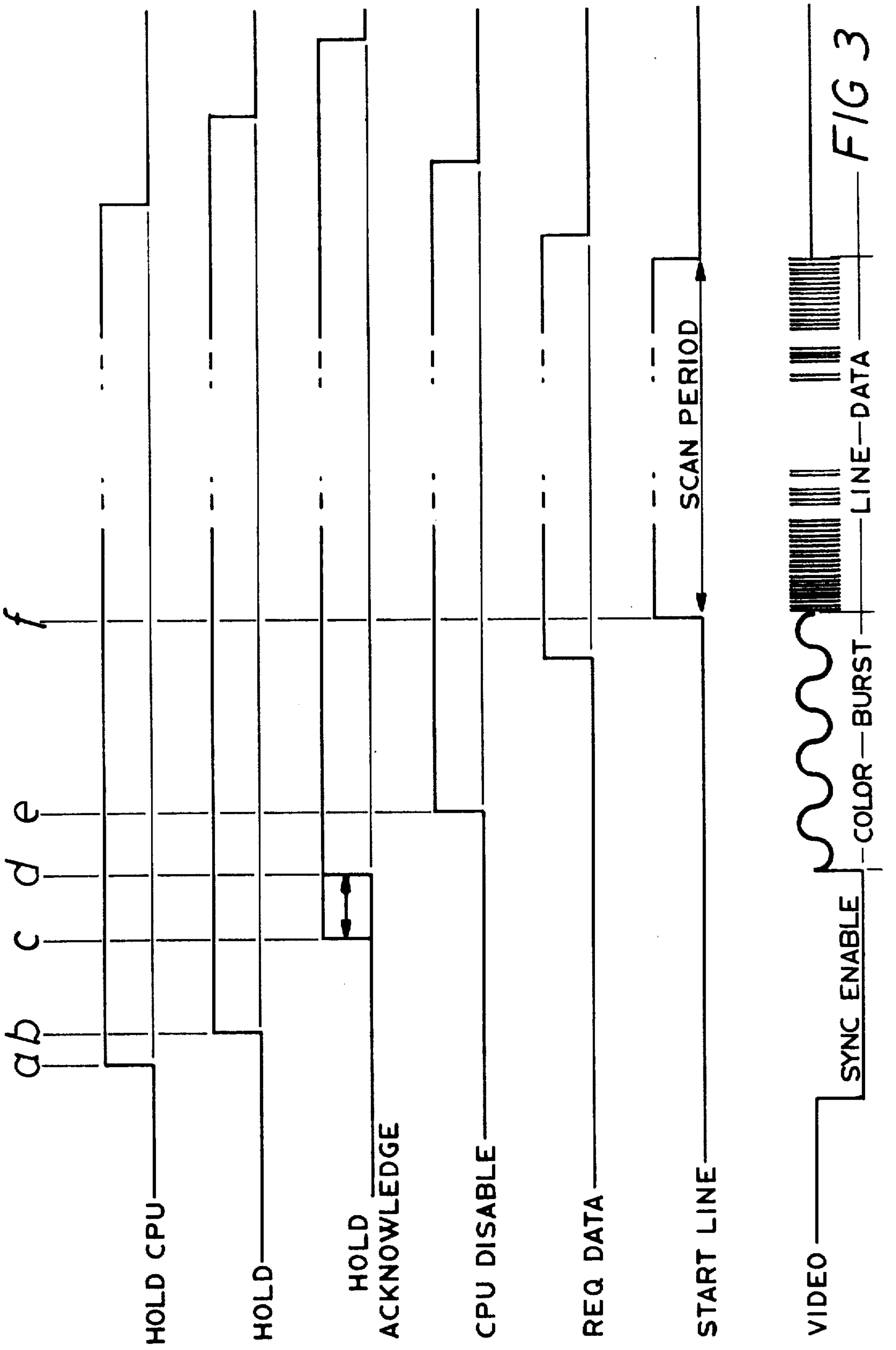
FIG. 3 is a timing diagram showing the control waveforms associated with processing a line of data through display interface device 140.

In order to receive INITIAL DATA from CPU 110 and LINE DATA from memory 170, interface controller 210 periodically interrupts CPU 110 by providing HOLD CPU (at $t=a$, see FIG. 3) to DMA controller 220 which establishes a HOLD mode ($t=b$) via command bus 172 in CPU 110. CPU 110 stops operation, and returns HOLD ACKNOWLEDGE (between $t=c$ and $t=d$) back to DMA controller 220. DMA controller 220 then obtains control of address bus 174 and data bus 176 by means of CPU DISABLE ($t=e$). The most recent INITIAL DATA generated by software in CPU 110 enters port 240 and interface controller 210 provides REQ DATA to DMA 220. DMA controller 220 forwards MEMORY ADDRESS data to programable memory 170 on address bus 174 which identifies the location in memory 170 of each picture element (pixel) of the oncoming scan line. DMA controller 220 then receives LINE DATA on data bus 176 directly from programable memory 170 which is immediately processed into pixel controller 230. LINE DATA is processed out of pixel controller 230 to video processor 250 a fixed period of time after HOLD in response to START LINE from interface controller 210. LINE DATA is four parallel bits of GREYSCALE or COLOR during the low resolution modes ($64 \times 64$ and $32 \times 32$) and a single bit of intensity data during the high or times four resolution mode (128 × 128). LINE DATA is received by black and white D/A 252 and color D/A 254 for providing VIDEO OUTPUT via video amplifier 260.

Burst gate 270 combines BURST ENABLE from the interface controller 210 with the color video subcarrier (OSC from an oscillator clock within interface controller 210) to form COLOR BURST to video amplifier 260. COLOR BURST is a reference phase sync provided on the back porch of each scan line (see FIG. 3) for initiating the color decoding circuit within TV 150.

Sync gate 280 combines VER SYNC from interface controller 210 (a wide pulse defining the height of the TV field) with HOR SYNC from controller 210 (a narrow pulse defining the left-hand edge of the TV field) to provide video amplifier 260 with SYNC ENABLE (a very short pulse for introducing the back porch of each scan line).

PIXEL CONTROLLER 230

Figure 4:
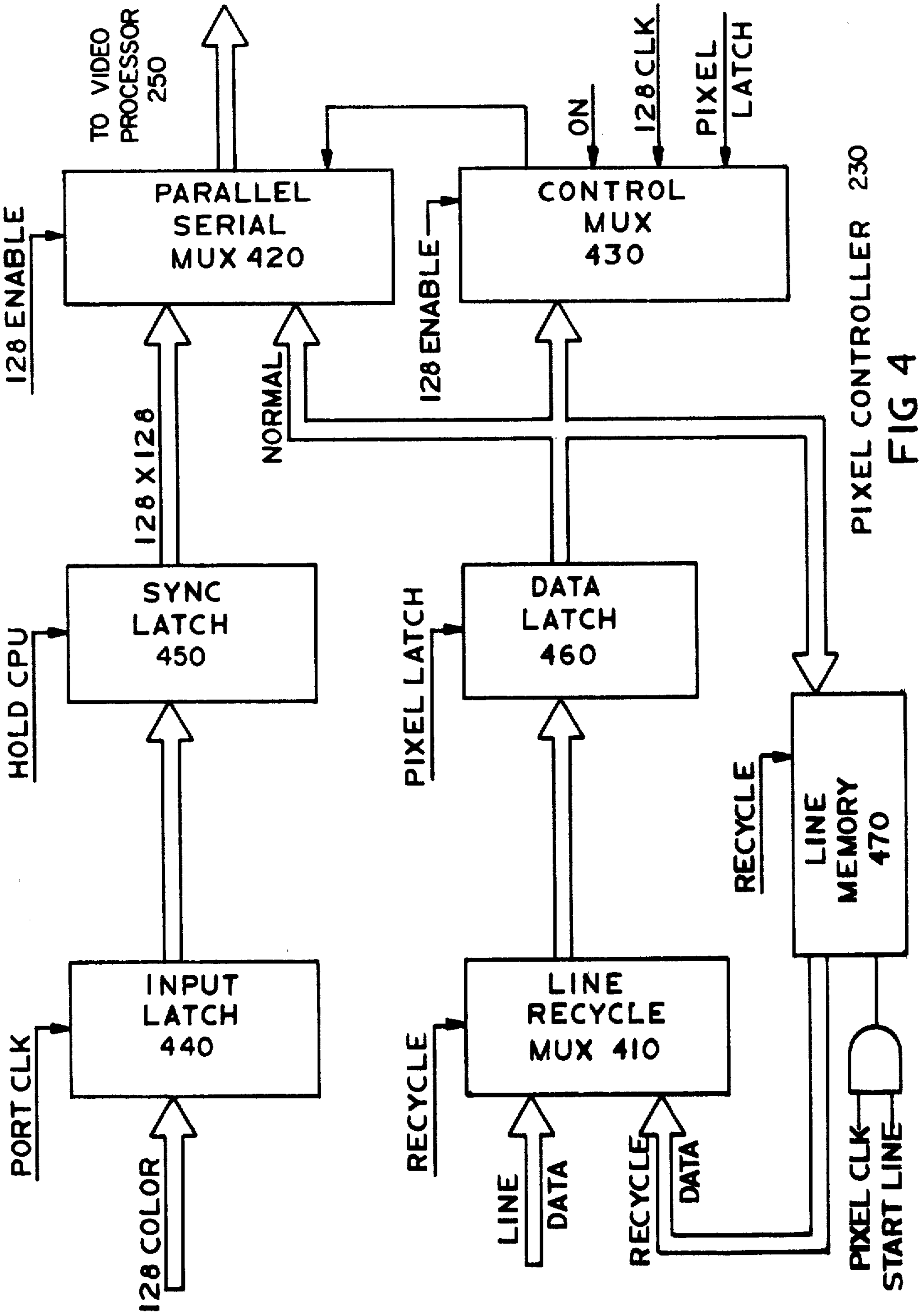
FIG. 4 is a logic circuit showing pixel controller 230 of FIG. 2.

FIG. 4 shows the circuit elements of pixel controller 230. Four bits of LINE DATA from DMA 220 enter pixel controller 230 at line-recycle multiplexer 410, and exit from pixel controller 230 via parallel-serial multiplexer 420. During the low resolution-full color modes (64 × 64 or 32 × 32) LINE DATA enters video processor 250 as four parallel bits of COLOR or GREYSCALE data. During the high resolution mode (128 × 128) LINE DATA enters video processor 250 serially as a single bit of INTENSITY data. The parallel-serial mode of multiplexer 420 is determined by select signal 128 ENABLE from FORMAT DATA.

In the 128 × 128 mode (high resolution), control multiplexer 430 cooperates with parallel-serial multiplexer 420 to merge the four LINE DATA bits into a single bit of data flow. Also during 128 × 128 mode, 128 COLOR (from FORMAT DATA) determines the single display color and intensity for TV 150. COLOR 128 is loaded into latch 440 in response to PORT CLK from port 240, and advanced to synchronizing latch 450 in response to HOLD CPU from interface controller 210, and selected through multiplexer 420 by 128 ENABLE.

LINE DATA is recycled through pixel controller 230 as required in order to match the number of lines of data (128 or 64 or 32) with the number of scan lines displayed in TV 150 (which in this embodiment is 384 lines out of an available height of 488). That is, the display of TV 150 is expanded vertically by systematically repeating the LINE DATA. In addition, each picture element may be expanded horizontally in the TV display as desired by holding each pixel in latch register 460 for the desired number of clock periods. LINE DATA from line-recycle multiplexer 410 advances to data latch register 460 and during the period of horizontal expansion is continuously presented to parallel-serial multiplexer 420 and control multiplexer 430. PIXEL LATCH from controller 210 advances the next pixel from multiplexer 410 into data latch 460 terminating the display of the previous pixel. In the embodiment shown, 128 pixel clock periods are used for the display out of about 180 clock periods required to scan one line of the display. LINE DATA is entered into line memory 470 from data latch 460. The entire scan line of LINE DATA accumulates in line memory 470, and is recycled through line-recycle multiplexer 410 in response to RECYCLE from controller 210 for vertical display expansion.

VIDEO PROCESSOR 250 — BLACK AND WHITE D/A 252

Figure 5:
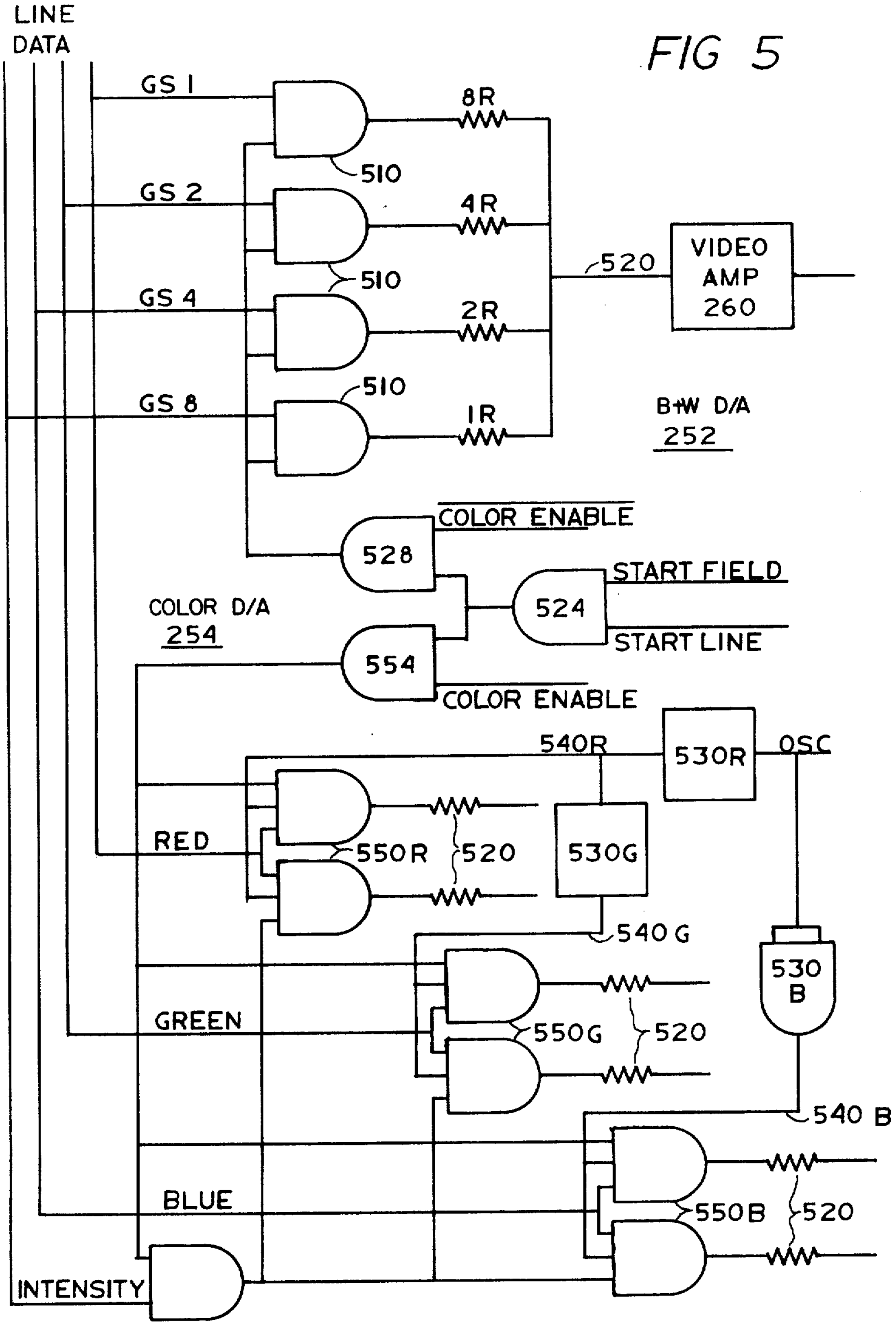
FIG. 5 is a logic circuit showing black and white D/A 252 and color D/A 254 of FIG. 2.

FIG. 5 (top) shows an embodiment of black and white D/A 252 which receives digital LINE DATA from pixel controller 230 and provides quantized current levels to video amplifier 260. Gating network 510 provides greyscales states 1–16 from four bits of GREYSCALE input LINE DATA (GS-1, GS-2, GS-4, and GS-8). Weighting resistor series 1R, 2R, 4R, and 8R progressively double in value causing the current from the associated gates in network 510 to decrease by halves. The current through each weighting resistor corresponds to the binary digit value of the associated GREYSCALE input. The current through all of the weighting resistors is combined by summing amplifier 260 via amplifier lead 520 forming one of sixteen levels corresponding to the four bits of binary GREYSCALE input. In order for GREYSCALE data to appear at amplifier lead 520, the following signals must be present:

START FIELD from controller 210 (a wide pulse for defining the height of the display within the TV field).

START LINE from controller 210 (a narrow pulse for identifying the left-hand margin of the display within the TV field).

COLOR ENABLE (bar) from FORMAT DATA.

The above signals are combined via enable gate 524 and B+W gate 528 to enable portions of gating network 510 when GREYSCALE data is available.

VIDEO PROCESSOR 250 — COLOR D/A 254

FIG. 5 (bottom) shows an embodiment of color D/A 254 which receives digital LINE DATA from pixel controller 230 and provides phase coded pulses to video amplifier 260. The square wave OSC signal (standard color subcarrier frequency) is progressively delayed by delay circuits 530B (blue), 530R (red), and 530G (green) to provide color carriers on leads 540B, 540R, and 540G of a fixed blue, red, and green respectively. The color shades on lines 540 are determined by the amount of delay in delay circuits 530. The color carriers are combined with four bits of COLOR input LINE DATA from pixel controller 230 through gate pairs 550B, 550R, and 550G. The COLOR data includes three colors plus two levels of intensity. In order for COLOR data to appear at amplifier lead 520 the following signals must be present:

START FIELD

START LINE

COLOR ENABLE — FORMAT DATA

These signals are combined via enable gate 524 and color gate 554 to enable gate networks 550.

If desired, the COLOR data may be sixteen intensity levels of a single color by employing a sixteen level color D/A similar to black and white D/A 252. Alternatively, three sixteen level color D/As may be employed simultaneously to provide sixteen intensity levels of any combination of red, blue, and green. In such a three part sixteen level color D/A, greyscale may be provided by combining all three colors at the same intensity level, eliminating the need for black and white D/A 252.

INTERFACE CONTROLLER 210 — HOR SYNC GENERATOR 600

Figure 6:
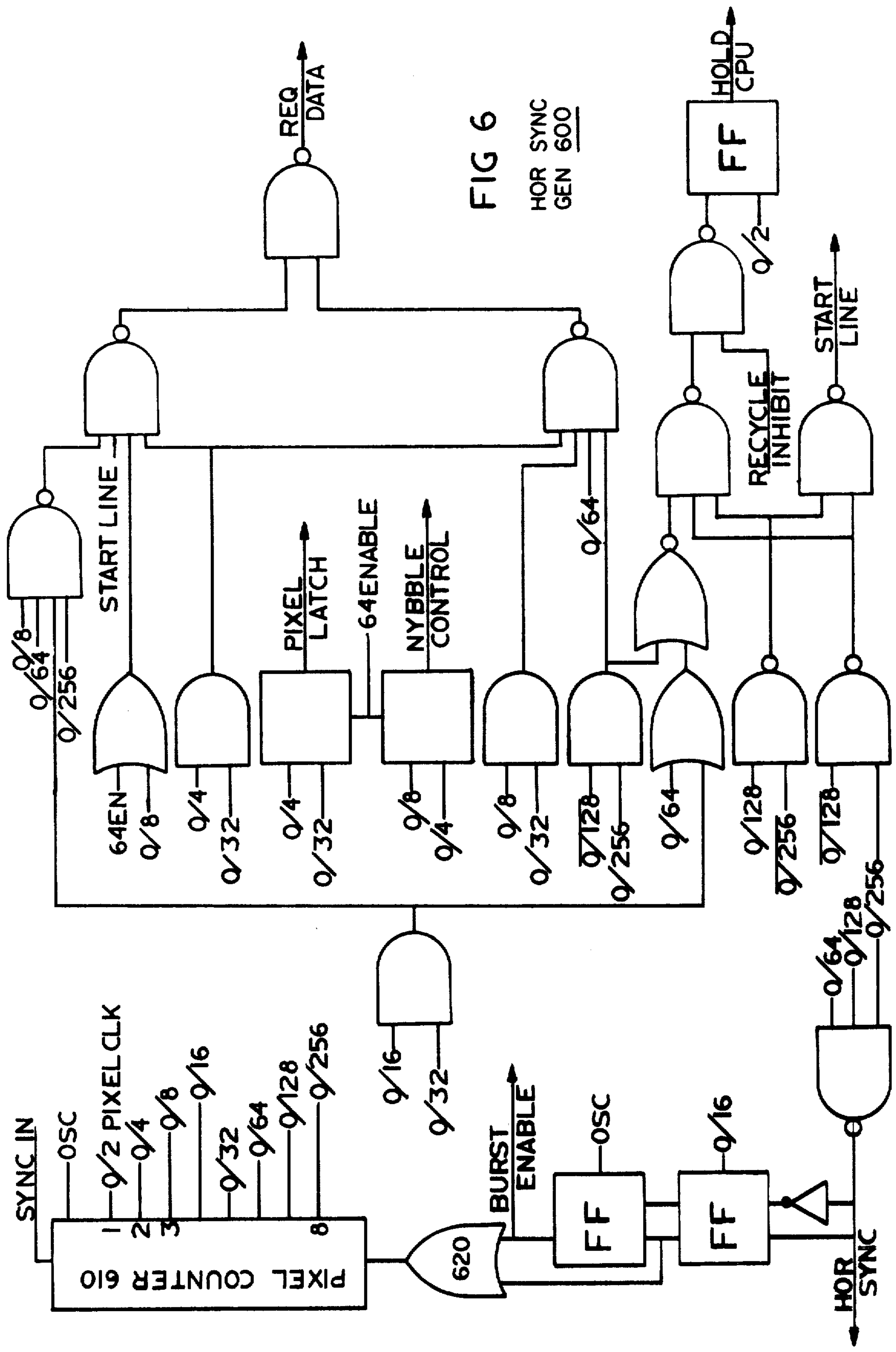
FIG. 6 is a logic circuit showing horizontal sync generator 600 within interface controller 210 of FIG. 2.

FIG. 6 shows the circuit elements of horizontal sync generator 600 which provides the horizontal sync to CRT 150 and the internal clocks required by display interface 140. An eight stage divide by two counter 610 reduces OSC (the fundamental oscillator clock frequency) into the following submultiples:

OSC—3.580 MHz
0/2 (PIXEL CLK)—1.790 MHz
0/4—0.895 MHz
0/8—0.447 MHz
0/16—0.224 MHz
0/32—0.112 MHz
0/64—0.056 MHz
0/128—0.028 MHz
0/256—0.014 MHz

In addition horizontal sync generator 600 supplies the following command signals:

HOR SYNC (pulse) — periodically derived from the OSC submultiples and applied to sync gate 280 in combination with VER SYNC for defining the start of each horizontal scan of the electron beam.

START LINE (pulse) — periodically derived from the OSC submultiples subsequent to HOR SYNC and applied to the D/A circuits 252 and 254 (enable gate 524) in combination with START FIELD for turning on the beam current in CRT 150 which defines the period of actual data display during each horizontal scan of the electron beam.

REQ DATA (pulse) — derived by START LINE and the OSC submultiples and applied to DMA 220 in conjunction with HOLD CPU for initiating the take over of busses 174 and 176 by interface 140 and disabling CPU 110 to obtain a new block or line of LINE DATA for pixel controller 230.

BURST ENABLE (level) is generated after HOR SYNC and enables burst gate 270 to pass OSC therethrough forming COLOR BURST into the video input to CRT 150. In the embodiment of FIG. 6, BURST ENABLE also clears counter 610 through NOR gate 620.

RECYCLE (pulse) — derived from the OSC submultiples subject to RECYCLE INHIBIT and applied to pixel controller 230 for establishing the recycle mode causing the previously displayed line of LINE DATA to be redisplayed in the next line.

HOLD CPU bar (pulse) temporarily inhibits the disabling of CPU 110 subsequent to RECYCLE.

PIXEL LATCH — derived from OSC submultiples for strobing data latch 460 in pixel controller 230 just prior to displaying each picture element. Data latch 460 converts each pixel pulse of LINE DATA input into a stable signal (dc level) output for the duration of that picture element. The timing of PIXEL LATCH determines the width of the displayed picture elements.

NYBBLE CONTROL — derived from the OSC submultiples for strobing nybble latch 966 in DMA 220 causing each new nybble (4 bits) of LINE DATA to enter pixel controller 230.

INTERFACE CONTROLLER 210 — VER SYNC GENERATOR 700

Figure 7:
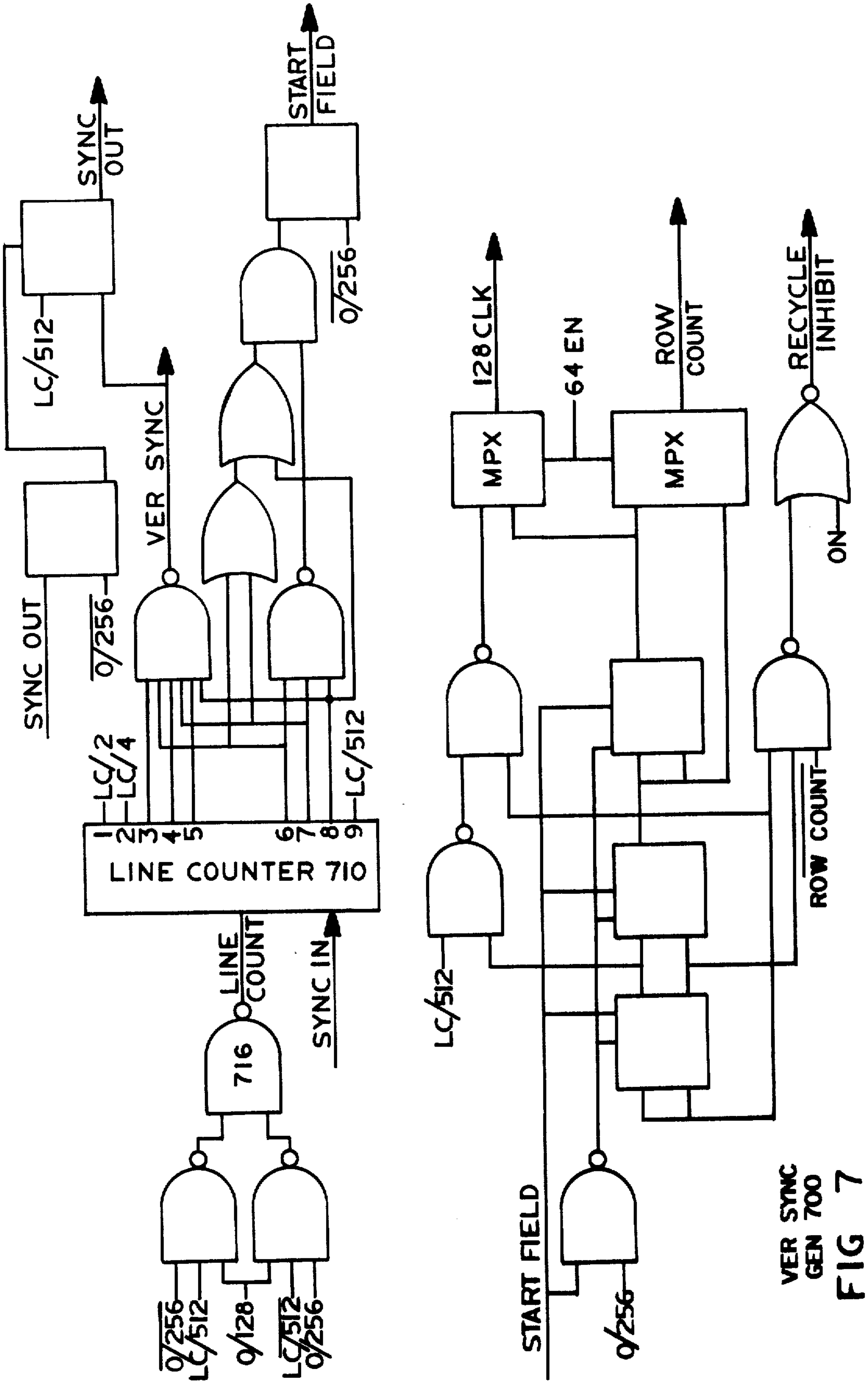
FIG. 7 is a logic circuit showing vertical sync generator 700 within interface controller 210 of FIG. 2.

FIG. 7 shows the circuit elements of vertical sync generator 700 which counts the scan lines and provides the vertical sync to CRT 150. A nine stage line counter 710 responds to LINE COUNT from gate 716 to generate nine submultiples of LINE COUNT which provides the following command signals:

VER SYNC (level) — periodically established and maintained by the submultiples of LINE COUNT for defining the height of the CRT field.

START FIELD (level) — subsequent to FIELD SYNC to define the height of the actual display within the CRT screen area, also forms part of STATUS DATA.

SYNC IN and SYNC OUT — permit several display interfaces 140 to operate simultaneously from the same CPU 110, without DMA time conflicts.

The logic circuit in the lower portion of FIG. 7 is responsive to START FIELD, LC/512 (the highest count of line counter 710), and 0/256 (the highest count of pixel counter 610) to provide the following command signals:

ROW COUNT — generated once each line for incrementing address counter 910 in DMA 220.

128 CLOCK — causes control multiplexer 430 to count by ones to permit 128 × 128 LINE DATA bits to advance serially to video processor 250 instead of four bits in parallel.

RECYCLE INHIBIT (pulse) — inhibits the RECYCLE mode in pixel controller 230 when new LINE DATA is being loaded.

DMA 220 — CPU CONTROL LOGIC 800

Figure 8:
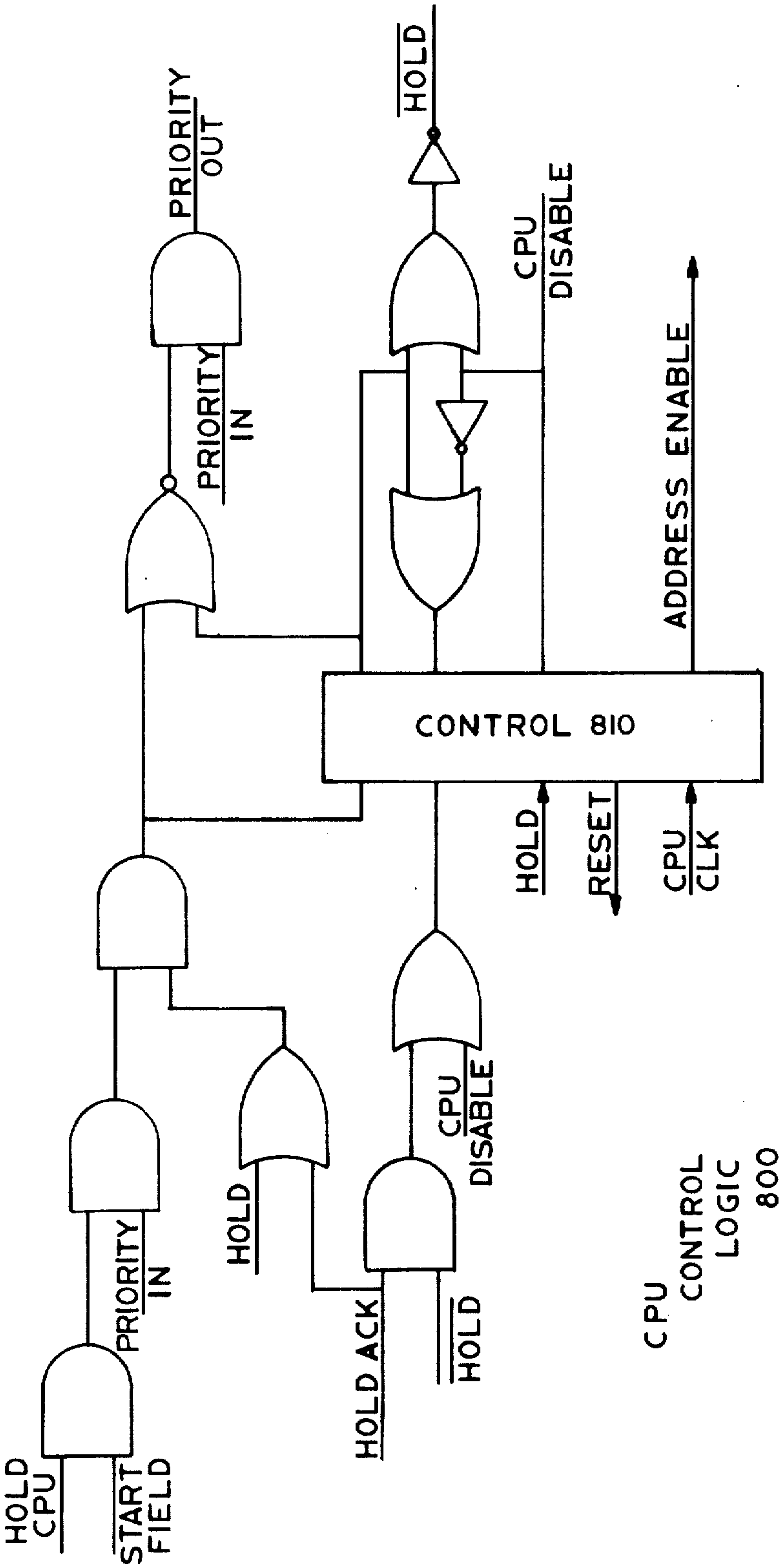
FIG. 8 is a logic circuit showing CPU control logic 800 within DMA 220 of FIG. 2.

FIG. 8 shows the circuit elements of CPU control logic 800 which responds to HOLD CPU and START FIELD from interface controller 210 and to HOLD ACKNOWLEDGE from CPU 110 for providing:

HOLD — to CPU 110 for stopping CPU 110 during LINE DATA transfer to display interface 140.

CPU DISABLE — to CPU 110 for taking over address bus 174 and data bus 176.

PRIORITY OUT — to CPU 110 which in conjunction with PRIORITY IN from CPU 110 permits CPU 110 to interface with more than one DMA device. Use of this priority connection prevents DMA device time conflicts during use of data bus 176 and address bus 174.

Control 810 provides the timing protocol for bus transfer by DMA 220. ADDRESS ENABLE determines the switching state of tristate devices connected between MEMORY ADDRESS and CONTROL ADDRESS.

DMA 220 — MEMORY ADDRESS CIRCUIT 900

Figure 9:
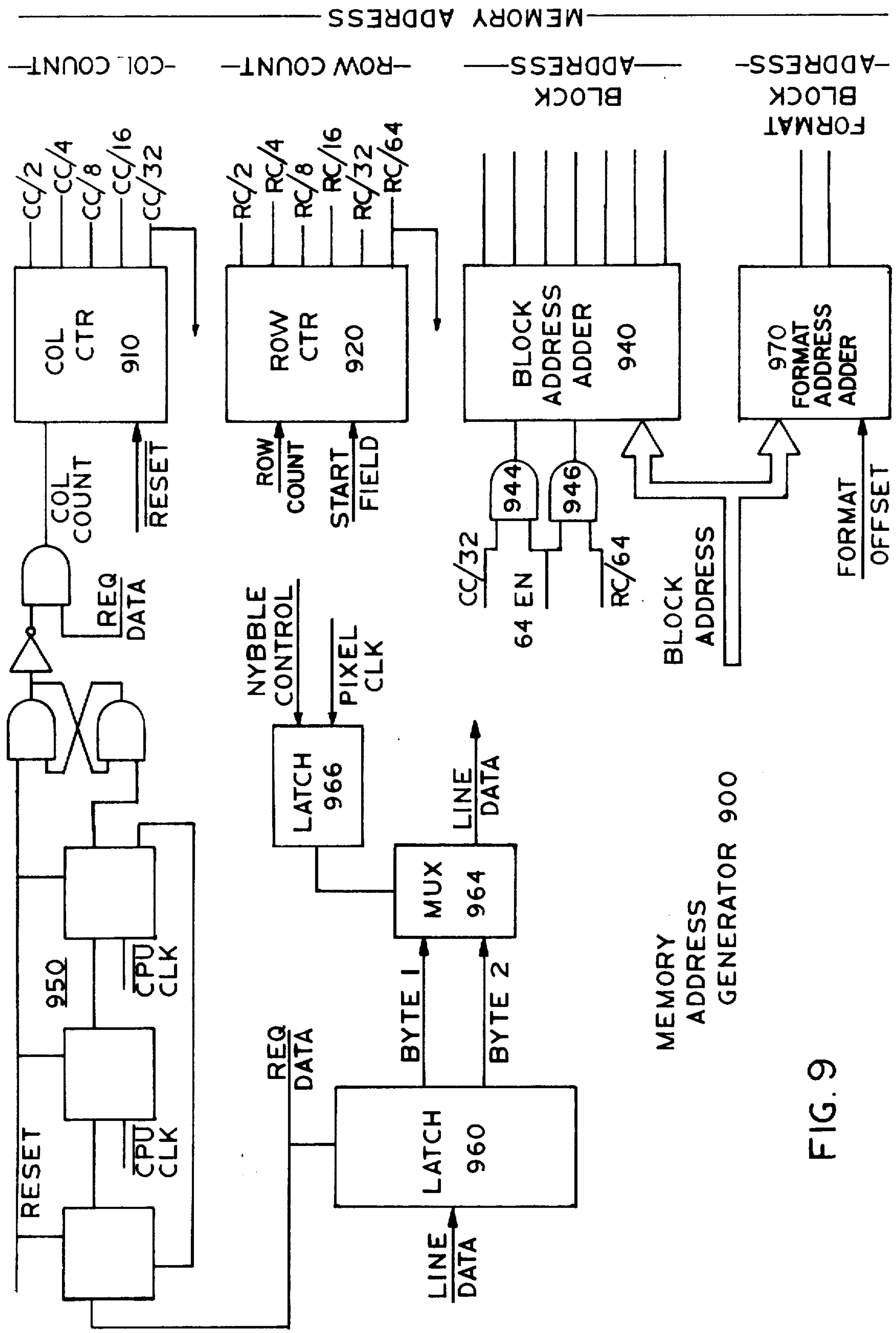
FIG. 9 is a logic circuit showing memory address circuit 900 within DMA 220 of FIG. 2.

FIG. 9 shows the circuit elements of memory address circuit 900 for retrieving display data from memory 170 based on a basic memory block which in this embodiment is 32 columns wide by 32 rows high—1024 four bit bytes. Memory 170 in the embodiment is shown as an eight bit memory in which the basic memory block is 16 × 32—512 two byte units. Block column counter 910 is incremented from 0 to 15 by COL COUNT to count out the 32 bytes or columns in each row of the basic memory block. The output of column counter 910 (CC/2, CC/4, Cc/8, and CC/16) provides the 4 LSBs of MEMORY ADDRESS to CPU 110. Block row counter 920 responds to ROW COUNT to count out the 32 rows in the basic memory block. The output of row counter 920 (RC/2, RC/4, RC/8, RC/16, RC/32) forms the next 5 LSBs of MEMORY ADDRESS. BLOCK ADDRESS from CPU 110 forms the 7 MSBs of MEMORY ADDRESS for identifying each basic memory block in memory 170 and is held in block address latch in output port 16. As new data is retrieved from memory 170, BLOCK ADDRESS is forwarded to block address adder 940 to form the 7 MSBs of MEMORY ADDRESS. The 7 bits of BLOCK ADDRESS can identify up to 128 basic memory blocks each of which contain 1024 four bit bytes. The allocation of MEMORY ADDRESS bits between the MSB portion or BLOCK ADDRESS (for identifying the basic memory blocks) and the LSB portion (for retrieving data from within each block) may vary depending on the size and number of the basic memory blocks, the size of memory 170 and the number of bits in MEMORY ADDRESS.

CPU sync circuit 950 shown in FIG. 9 synchronizes COL COUNT with CPU CLK from CPU 110 in order to maintain the data retrieval rate of memory 170 within the preferred range. CPU sync circuit 950 has an output latch for holding each ADDRESS CLK.

The eight bits of LINE DATA in line data latch 960 are time sequenced into two sequential groups of four bits each by line data multiplexer 964 in response to NYBBLE CONTROL select signal from nybble latch 966.

PORT 240

Figure 10:
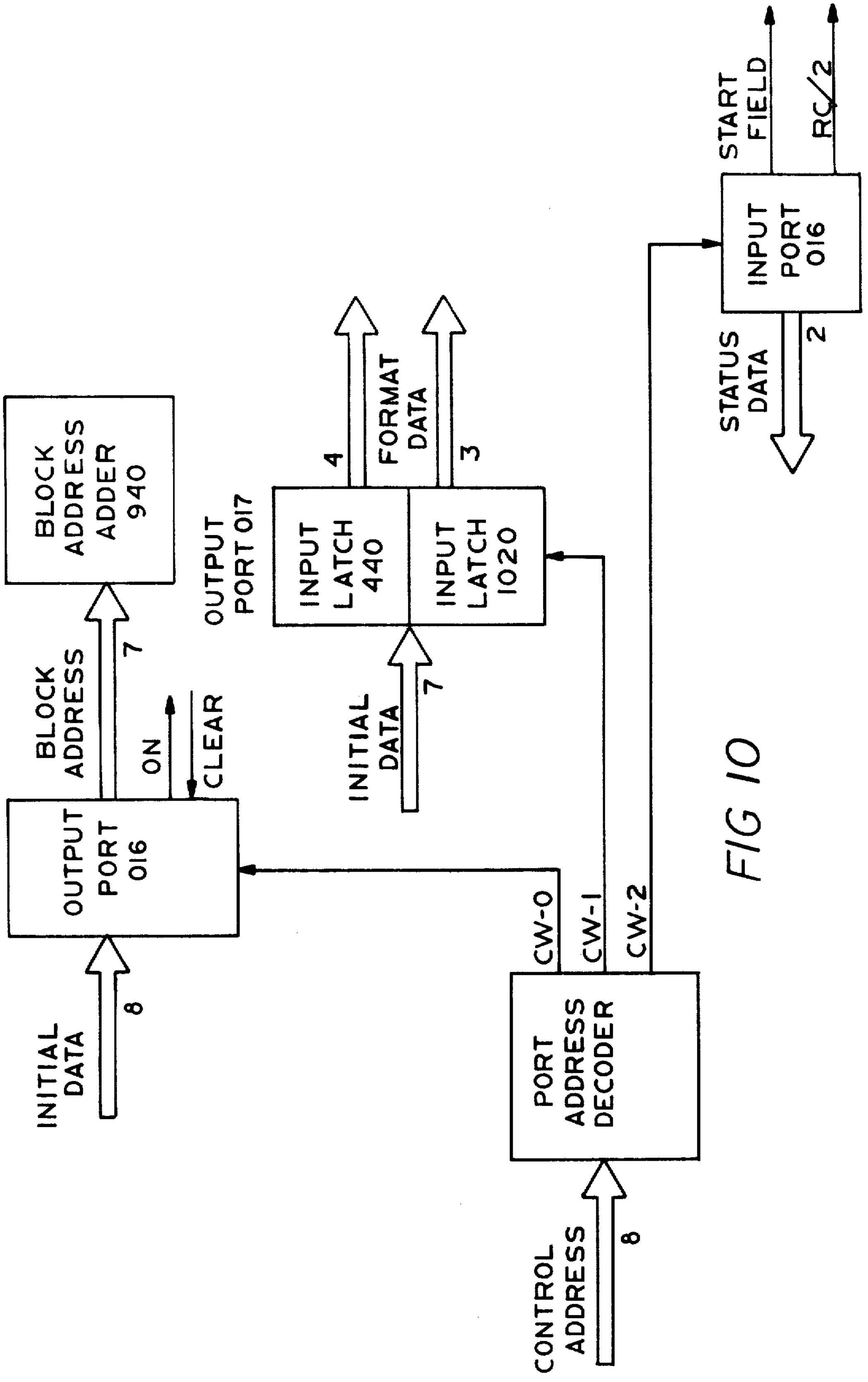
FIG. 10 is a logic circuit showing port 240 of FIG. 2.

CPU 110 communicates with display interface 140 through a high speed data link to DMA 220, and output ports 016 and 017 to port 240 and input port 016 from port 240 as shown in FIG. 10. These ports are described in detail below for the embodiment shown:

| OUTPUT PORT 016 - (8 bits) | | | | | | | |
|---|---|---|---|---|---|---|---|
| MSB | | | | | | | LSB |
| ON/OFF | A15 | A14 | A13 | A12 | A11 | A10 | A9 |
| | --------BLOCK ADDRESS-------- | | | | | | |

The MSB of output port 016 enables and disables display interface 140 (ON is MSB=1, $\overline{\text{ON}}$ is MSB=0). Display interface 140 can also be turned off manually by depressing the "clear" switch on CPU 110 front panel. The remaining seven bits of output port 016 form BLOCK ADDRESS which identifies the starting location of the picture to be displayed from memory 170. As will be discussed below, the picture may require 512 bytes of memory or 2K bytes of memory depending on the mode in which display interface 140 is operating.

OUTPUT PORT 017 — (8 bits)

| OUTPUT PORT 017 - (8 bits) | | |
|---|---|---|
| D7 | Not used. | |
| D6=1 | 128 ENABLE - (resolution times four). Color and intensity set by D4 to D0. | |
| D6=0 | 128 ENABLE (bar) lower resolution. Color and intensity of each picture element set by 4-bit words in the computer memory. | |
| D5=1 | 64 ENABLE picture in 2K bytes of memory (64 × 64). | |
| D5=0 | 64 ENABLE (bar) picture in 512 bytes of memory (32 × 32). | |
| D4=0 | COLOR ENABLE (bar) - black and white. | |
| D4=1 | COLOR ENABLE | |
| D3=1 | High intensity color. | In resolution × 4 |
| D3=0 | Low intensity color. | black-and-white mode, |
| D2=1 | Blue | D3 is the most |
| D2=0 | No blue | significant bit of |
| D1=1 | Green | 4-bit intensity control |
| D1=0 | No green | word. |
| D0=1 | Red | Bit D0 is the least |
| D0=0 | No red | significant bit. |

Output port 017 provides FORMAT DATA for initialization. Bit D7 is not used. Bit D6 is used to set normal resolution (32 × 32 element picture for 512 bytes or b 64 × 64 element picture for 2K bytes) or resolution X 4 (64 × 64 element picture for 512 bytes or 128 × 128 element picture for 2K bytes). Bit D5 sets the amount of computer memory (starting at the location given to output port 016) allocated to the picture. When D5 is "1" 2K bytes of memory are used. When D5 is "0" 512 bytes are used. Bit D4 is used to select between a black-and-white display and a color display. Bits D3 - DO are used in resolution X 4 mode to set the color of a color picture or the intensity of a black-and-white picture. Bits D3 — DO are not used in normal resolution mode.

| INPUT PORT 016 | |
|---|---|
| D7 | D6 |
| ODD-EVEN | START FIELD |

Input port 016 provides STATUS DATA to CPU 110. Only two bits of input port 016 are used. Bit D7 is low during odd lines and high during even lines. Bit D6 goes low for 4 milliseconds between frames to indicate the end of the previous frame and the start of the next frame.

Port address decoder generates signals CW-0, CW-1, and CW-2 in response to CONTROL ADDRESS from CPU 110 on address bus 174. The CW signals activate the proper port permitting entry or exit of the proper data.

APPLICATIONS INVOLVING VARIATIONS IN BLOCK ADDRESS

In the embodiment shown, MSBs of MEMORY ADDRESS is BLOCK ADDRESS from CPU 110 and originates from software or other input to CPU 110. BLOCK ADDRESS could also be supplied by a counter similar to address counter 910 and 920, or even manually entered through a row of binary switches. Changing BLOCK ADDRESS introduces a different basic memory block for sequential addressing by memory address circuit 900 and display on CRT device 150. By incrementing BLOCK ADDRESS in a predetermined series, any desired set of different display fields may be sequentially displayed. Slow incrementing may be employed to display a set of still pictures, i.e., messages; and rapid incrementing vertically synced with CRT 150 may be employed to produce animation. The basic animation technique is accomplished by sequentially incrementing BLOCK ADDRESS to introduce a new basic memory unit for each frame or vertical sweep of CRT 150. A 48K eight bit memory 170 contains 48 frames of 128 bit × 138 bit black and white display, and can operate display system 100 in animation mode for over a second before requiring a memory update by CPU 110. Memory space may be conserved by introducing a new basic memory block only as required by movement in the display. The same basic memory block may be redisplayed for frames in which no motion occurs relative to the previous frame.

A quadrant display (four 32 × 32 subfields within a 64 × 64 field) can be provided by systematically incrementing the two LSBs of the seven bits of BLOCK ADDRESS through quadrant gates 944 and 946. These first two bits address four separate basic memory blocks within memory 170. The four blocks may be displayed simultaneously by incrementing the first bit at the end of each row addressed in memory 170 (every one half CRT scan line in the quadrant mode) and incrementing the second bit at the end of each data block (every one half CRT field in the quadrant mode). The desired incrementing is conveniently accomplished by signal CC 32 from column counter 910 and signal RC 64 from row counter combined with 64EN at gates 944 and 946. The more significant bits of BLOCK ADDRESS may be selectively incremented to accommodate four desired data blocks which do not have sequential addresses.

A variety of multifield displays may be generated by systematically incrementing the proper combinations of the MSBs of MEMORY ADDRESS. For example, sixteen 32 × 32 subfields may be displayed in a 128 × 128 field by incrementing three bits instead of two. Six subfields may be displayed as two rows of three subfields each by providing nonsymmetrically spaced and staggered incrementing pulses. Fractions of selected basic memory blocks may be addressed and displayed in mosaic fashion with other fractions by properly interfacing address counters 910 and 920 with start address adder 940. Using this fraction technique, specific words may be lifted from vocabulary lists in the basic memory blocks, and displayed on CRT 150 to convey a message.

The column and row of MEMORY ADDRESS may be varied in response to manually generated X and Y coordinates such as from a control stick or steering wheel to directionally shift the content of the display. BLOCK ADDRESS is the start address of the first pixel in each field. X and Y may be offset by one half the X and Y dimension of the field from the start address to generate a center address or operator location. The operator may then in effect drive through the memory simulating motion in a game; or scan a large record (in memory) in an information retrieval device.

Vertical panning may easily be accomplished by incrementing the row count of MEMORY ADDRESS. That is by changing the start scan line each frame, the display will shift into memory regions above or below the block displayed. This type of panning or row shifting is along a vertical band of memory perpendicular to the scan lines in the display and to the rows in memory. Horizontal panning may be accomplished by scanning the CRT vertically and incrementing the column count of MEMORY ADDRESS. Vertical (or horizontal) stepping may be provided by incrementing the MSBs of row (or column) count of MEMORY ADDRESS.

APPLICATIONS INVOLVING VARIATIONS IN FORMAT DATA

FORMAT DATA must be coordinated with the contents of memory 170 in order to provide a meaningful display on CRT 150, and may be changed instantaneously in order to accommodate multimode displays. For example, FORMAT DATA mode may be varied mid scan to provide a high resolution, black and white, alphanumeric subfield with adjacent lower resolution, full color subfields. In more exotic applications FORMAT DATA color may be systematically varied by software or manual input within each display frame to generate a secondary image within the primary image provided by LINE DATA from memory 170. FORMAT DATA color may be varied from frame to frame causing the secondary image to move with respect to the primary image.

In order to minimize the software burden of coordinating LINE DATA and FORMAT DATA within each field, a flag map of FORMAT DATA may be placed in memory and scanned simultaneously with LINE DATA. As each pixel of LINE DATA is displayed, the appropriate FORMAT DATA is automatically forwarded to interface device 140 through output port 17. Preferably this twin addressing may be accomplished by using a common row count and column count, and generating a separate block address for FORMAT DATA. FIG. 9 shows FORMAT BLOCK ADDRESS generated in format address adder 970 by adding FORMAT OFFSET to the LINE DATA BLOCK ADDRESS. The ROW COUNT and COLUMN COUNT portions of MEMORY ADDRESS simultaneously identify corresponding pixels of FORMAT DATA and LINE DATA within their respective blocks.

GENERAL OPERATION

In order to generate a TV picture with interface 140, the information from computer memory 170 must be properly formatted. In resolution X 4 mode each point on the TV screen is controlled by just one bit in the computer memory. When that bit is a "1" the corresponding element of the picture is on. When that bit is a "0" the picture element is off. In resolution X 4 mode the color and intensity of the picture is set by bits D0 to D3 of FORMAT DATA at output port 017. For full color in resolution X 4 mode, multiple frames of different colors must be interleaved.

In normal resolution mode the color and intensity of each element of the TV picture are controlled by a four-bit "nybble" in the computer memory. Two elements of the picture are thus stored in each byte (8 bits) of memory. (For this reason a 64 × 64 picture in normal resolution mode requires 2K of memory.) The lowest order bit of each nybble (DO) determines whether the corresponding element of the picture contains red (1) or no red (0). Similarly D1 controls green, D2 controls blue, and D3 sets either high intensity or low intensity color. In black-and-white mode these four bits are instead used to specify one of 16 levels of grey.

When writing programs for interface 140 displays it is important to remember that the TV picture is stored as a special coded sequence in the computer memory. Interface 140 simply interprets this code to form a TV picture. Two different codes are used depending on whether interface 140 is used in normal resolution mode or in resolution X 4 mode (as set by the format bit D6 sent to output port 017).

In normal resolution mode four bits of computer memory are used to code each element of the picture. A 32 × 32 picture requires 512 bytes of memory. A 64 × 64 picture requires 2K bytes of memory. In normal resolution mode one byte of memory is used to represent two adjacent elements of the picture as shown below:

| MSB | | | | | | | LSB |
|---|---|---|---|---|---|---|---|
| HI/LO - | GREEN - | BLUE - | RED - | HI/LO - | GREEN - | BLUE - | RED |
| ---------------one picture element--------------- | | | | -------------adjacent picture element------------- | | | |

In resolution X 4 mode each bit of memory is used to either turn on or off a single element of the picture. The eight picture elements controlled by a single byte have the following geometric relationship:

| | | | |
|---|---|---|---|
| D0 LSB | D1 | D4 | D5 |
| D2 | D3 | D6 | D7 MSB |

In resolution X 4 mode one byte of memory is used to represent eight adjacent elements of the picture.

The 2K byte picture is stored in memory as four quadrants. Each quadrant of the picture occupies one 512-byte page of memory. Only one page of memory is displayed for a 512-byte picture. The sequence in which memory 170 is scanned in making a 2K byte picture is shown in the following memory map:

| | |
|---|---|
| 0, 1, 2----14, 15 | 512, 513--------527 |
| 16, 17----------30, 31 | 528------------------- |
| 32------------------47 | - - |
| 48------------------63 | - - |
| 64------------------79 | - - |
| - - | - - |
| - - | - - |
| 496---------------511 | 1008---------- 1023 |
| 1024------------1039 | 1536---------- 1551 |
| 1040------------------ | 1550------------------ |
| - - | - - |
| - - | - - |
| 1520------------1535 | 2032---------- 2047 |

The first quadrant is displayed for 512-byte picture. All four memory quadrants are displayed in 2K byte picture.

DETAILED DESCRIPTION OF THE PREFERRED EMBODIMENT

Each item of computer display system 100 (and more particularly of display interface 140) is fully identified in the following paragraphs. Additional description of the circuits and operation thereof are given as required to enable one skilled in the art to make and use the invention.

The logic elements in the drawing (gates, inverters, flipflops, etc.) are standard TTL items manufactured by Texas Instruments Incorporated, and described in "TTL Data Handbook for Engineers" publication number CC-411. The flip-flops labeled JK are J-K 7473's. The multiplexers labeled "MPX" are sections of a Quad 2:1 multiplexer (74157).

CPU 110 may be a microcomputer such as Altair 8800 produced by MITS Incorporated, 6328 Linn NE, P.0. Box 8636, Albuquerque, New Mexico, described in *Altair* 8800 *Operating Manual* (1975) including program instructions in Part 4.

Display device 150 may be any conventional television set which can process standard broadcast transmissions.

Video modulator 160 may be a "Pixie Verter" rf modulator manufactured by ATV Research Inc. or other suitable device for generating the video carrier of channel 2 or 3 modulated by VIDEO OUTPUT.

Memory 170 may be a series of memory devices such as a RAM (2102).

Video amplifier 260 preferably provides a 3 volt peak-to-peak output having an 8 MHz bandwidth, and may be an input stage formated by a pair of differential transistors (two 2N3904's) for receiving the output of D/A 252 and D/A 254, and an output stage for driving a fifty ohm video cable to TV 150 (one 2N3906) connected in feedback relationship to the input stage.

Line-recycle multiplexer 410 may be Quad 2:1 multiplexer (74157) responsive to RECYCLE for selecting four bits of new LINE DATA or four bits of recycle data from line memory 470.

Parallel-serial multiplexer 420 may be a Quad 2:1 multiplexer (74157) responsive to 128 ENABLE for selecting four bits of 128 COLOR data in parallel or four bits LINE DATA in series.

Control multiplexer 430 may be an 8:1 multiplexer (74151) for converting four bits of parallel LINE DATA into four bits of serial LINE DATA to MUX 420.

Input latch 440 may be a Quad latch (74LS75) for receiving four bits of 128 COLOR (D1, D2, D3 and D4).

Sync latch 450 may be a Quad D flipflop (74175) for delaying the four bits of 128 COLOR until the start of a new scan line.

Data latch 460 may be a Quad D flipflop (74175) for delaying four bits of LINE DATA until the start of a new pixel.

Line memory 470 may be a Quad X64 bit shift register with an internal recirculation multiplexer to accommodate RECYCLE (TMS 3417, TI catalog CC-402 July 1971).

Delay circuits 530R and 530G may be LCR phase shifting networks for delaying the color carrier signal (OSC) in accordance with conventional color TV broadcast standards to obtain standard red and green colors. The delay in circuit 530B is merely the gating time because OSC at this point in the system is already 180° out of phase with COLOR BURST.

The weighting resistors in black and white D/A 252 may be any suitable weighted series of resistors from the 5% tolerance group such as:

LR = 7.5 K ohms
2R = 15 K ohms
4R = 30 K ohms
8R = 62 K ohms

The color weighting resistors for gate pairs 550R and 550G are 10K ohms each. Gate pair 550B may require 15K ohms in order to reduce the blue intensity.

Pixel counter 610 may be an eight stage binary counter (two 74161's in series) for counting 224 pixel periods (or clock periods) per scan line. Counter 610 is preset at 17 and stops counting at 240 via BURST ENABLE. Counter 610 includes a suitable clock generator such as a quartz crystal controlled oscillator for providing an output signal (OSC) of 3.579545 ±500 MHz.

Line counter 710 may be a nine bit binary counter formed by two 4 bit counters (7493) with reset to zero, in series with a flipflop (7473). Line counter 710 counts to 256 for the lines of the even field, and then skips one half a line and recounts to 256 for the odd field which is interleaved with the even field to reduce flicker. Line counter 710 establishes an entire frame in 512 counts or lines as opposed to 525 lines in conventional TV transmission.

Control device 810 may be a four bit shift register (7495) for controlling a tristate switching device at each bit of MEMORY ADDRESS.

Column counter 910 may be a five bit binary counter (one complete 7493 plus the A section of another 7493) for counting the 5 LBSs of MEMORY ADDRESS.

Row counter 920 may be a six bit binary counter (one half of a 7493 plus three sections of another 7493).

Block address adder 940 may be an eight bit binary adder (two 4 bit 7483's) for adding CC/32 and RC/64 to the block address in the Quadrant 32 × 32 mode.

Latch 960 may be two Quad D flipflops (74175) for receiving and holding eight bits of LINE DATA.

Multiplexer 964 may be a Quad 2:1 multiplexer (74157) for alternatively processing each four bit section of the eight bits of LINE DATA.

Latch 966 may be a D type flipflop (7474).

Output port 16 may be an eight bit storage device (two 7475's) for holding the BLOCK ADDRESS portion of INITIAL DATA. Output port 16 may be cleared from the front panel of CPU 110.

Input latch 1020 may be a four bit storage device (one 7475) for holding D4, D5, and D6 of FORMAT DATA.

Input port 16 is a tristate switching device.

What is claimed is:

1. An interface device for connection between a computer and a CRT device for processing predetermined blocks of display data from predetermined locations in a memory in the computer to form pixels having predetermined characteristics in the display fields of the CRT device, the interface device comprising:

- means for storing format data which defines the dimensions and number of fields displayed, and the characteristics of the pixels displayed therewithin;
- control means responsive to the format when read out from the means for storing for coordinating the data processing cycle of the computer memory and the data display cycle of the CRT device;
- pixel controller responsive to the read out format data for controlling the pixel characteristics and responsive to the control means for processing the display data;
- video means for converting the processed display data from the pixel controller into analog signals and adapted to apply the analog signals to the video circuit of the CRT device; and
- memory address means for addressing blocks of display data corresponding to the display fields of the CRT device, having a first address counter responsive to the format data for incrementing the least significant bit (LSB) portion of the memory address to the computer memory which defines the first dimension of each field displayed on the CRT device, and a second address counter responsive to the format data for incrementing the next LSB portion of the memory address to the computer memory which defines the second dimension of each field displayed on the CRT device.

2. The interface device of claim 1, wherein the memory address means has a block addresser responsive to the format data for providing the most significant bit portion of each memory address to the computer which addresses the block of display data corresponding to the field to be displayed on the CRT device.

3. The interface device of claim 2, wherein the format data determines the dimensions of the displayed pixel from a series of pixel dimensions.

4. The interface device of claim 3, wherein the fundamental pixel dimension is at least one CRT scan line in height and at least one clock period in width, and the dimensions of the other pixels in the series are multiples of the fundamental height and width dimension.

5. The interface device of claim 4, wherein the pixel controller extends the width dimension of each displayed pixel by increasing the number of clock periods during which the display data for each pixel is applied to the video means.

6. The interface device of claim 5, wherein the pixel controller has a clock responsive latch means for temporarily holding the display data for each pixel while applying the display data for each pixel to the video means.

7. The interface device of claim 4, wherein the pixel controller extends the height dimensional of each displayed pixel by redisplaying the same line of display data consecutively a predetermined number of times.

8. The interface device of claim 7, wherein the pixel controller has a line memory which temporarily stores each new line of display data for recycling the display data through the pixel controller to extend the height dimension of the pixels.

9. The interface device of claim 2, wherein the second address counter is responsive to the most significant bit of the first address counter to perform its incrementing 10. The interface device of claim 2, wherein the first address counter increments to address along a row of memory addresses containing display data which is sequentially displayed along at least a portion of a scan line of the CRT device.

11. The interface device of claim 10, wherein the first address counter addresses the display data for an entire scan line of the CRT device.

12. The interface device of claim 2, wherein the block addresser includes an incrementing means responsive to the format data for altering the most significant bit portion of the memory address.

13. The interface device of claim 12, wherein the incrementing means is responsive to the second address counter for changing the address of the most significant bit portion to identify other memory blocks.

14. The interface device of claim 13, wherein

- the second address counter identifies the rows within each memory block;
- each memory block provides the display data for one field of the display of the CRT device; and
- the incrementing means is responsive to the most significant bit of the second address counter for identifying successive basic memory blocks each containing a field of display data for sequential display on the CRT device.

15. The interface device of claim 13, wherein the incrementing means is responsive to both the first and second address counter for systematically addressing multiple memory blocks causing at least a portion of the display data in each of the addressed memory blocks to be displayed simultaneously on the CRT device forming multiple subfields within the display field of the CRT device.

16. The interface device of claim 13, wherein the incrementing means is responsive to the most significant bits in both the first and second address counter for systematically addressing multiple memory blocks causing the display data in the addressed memory blocks to be displayed simultaneously on the CRT device forming a grid pattern of square subfields within the display field on the CRT device.

17. The interface device of claim 16, wherein the incrementing means identifies four basic memory blocks for simultaneous display in a quadrant pattern.

18. The interface device of claim 13, wherein the fundamental pixel height dimension is equal to the fundamental pixel width dimension forming a fundamental pixel which is square.

19. The interface device of claim 18, wherein the series of pixels are squares of increasing dimension.

20. The interface device of claim 19, wherein the series of square pixels increase in dimension by powers of two.

21. The interface device of claim 3, wherein the control means is horizontally and vertically synced with the CRT device.

22. The interface device of claim 21, wherein the control means provides horizontal and vertical sync signals to the CRT device.

23. The interface device of claim 22, wherein the control means includes an oscillator for establishing an internal clock which periodically generates sync signals to the CRT device and data request signals to the computer.

24. The interface device of claim 2, wherein the memory address means additionally provides memory addresses to the computer memory for identifying at least a portion of the format data in predetermined blocks at predetermined locations in the computer memory.

25. The interface device of claim 24, wherein the memory address means provides a display data address and a format data address for each pixel of the CRT display.

26. The interface device of claim 25, wherein the first and second address counters of the memory address means identify display data for each pixel within a display data memory block and also identifies corresponding format data for each pixel within a corresponding format data memory block.

27. The interface device of claim 26, wherein the block addresser of the memory address means provides twin addresses offset by a constant amount for identifying a display data memory block and a corresponding format data memory block.

28. The interface device of claim 2, wherein the format data includes intensity levels and the video means includes D/A logic responsive to the intensity levels for providing analog signals of corresponding amplitude levels.

29. The interface device of claim 28, wherein format data includes color data, and the video means includes delay means between the D/A logic and the CRT device for phase shifting the analog signal from the D/A logic causing a color display on the CRT device.

30. The interface device of claim 29, wherein the color data includes blue, red, and green, and the delay means shifts the phase of at least the red and green.

31. The interface device of claim 30, wherein the format data includes a plurality of intensity levels of blue, red, and green, and the D/A logic includes a blue decoder, a red decoder, and a green decoder for providing analog signals of corresponding output levels of blue, red, and green, respectively.

* * * * *